March 21, 1961     E. R. GILLILAND     2,976,224
VAPORIZATION BY MOLTEN MATERIAL Filed Jan. 22, 1958     2 Sheets—Sheet 1

Edwin R. Gilliland     Inventor

By *Henry Berk* Attorney

March 21, 1961  E. R. GILLILAND  2,976,224
VAPORIZATION BY MOLTEN MATERIAL
Filed Jan. 22, 1958  2 Sheets-Sheet 2

Edwin R. Gilliland  Inventor

By Henry Berk  Attorney

United States Patent Office 2,976,224
Patented Mar. 21, 1961

2,976,224

VAPORIZATION BY MOLTEN MATERIAL

Edwin R. Gilliland, Arlington, Mass., assignor to Esso Research and Engineering Company, a corporation of Delaware Filed Jan. 22, 1958, Ser. No. 710,505

12 Claims. (Cl. 202—74)

This invention relates to process and apparatus for evaporating volatile liquid from a salt solution or other mixtures in direct contact with monvolatile molten material undergoing partial solidification. More particularly, it is concerned with demineralizing water in such manner from sea water.

Need for improvements in evaporating water or volatile liquid from salt contaminants is long standing, especially for better heat economy and avoidance of fouling by deposits on fixed heat transfer surfaces.

With the present invention, heat is transferred from circulating molten material contacted with a salt solution becoming concentrated in a vaporization zone. A portion of the molten material giving up heat is solidified to crystalline particles that become suspended in a remaining liquid phase of the molten material. Heat thus evolved can be made sufficient for vaporizing a portion of the water or volatile solvent from the salt solution under a pressure established by withdrawing vapor from the vaporization zone through a vapor-compressing pump. The pressure is set so that at the freezing temperature of the molten material, a desired proportion of the water or volatile solvent is vaporized by heat from the solidifying molten material. Difficulties of supplying heat to the residual concentrated salt solution through fixed heat transfer surfaces are thus avoided.

The compressed vapors from the vaporization zone are increased in temperature by the compressing pump and they can be brought into direct contact or heat exchange with the molten material containing solidified particles in a zone where such heat transfer causes condensation of the compressed vapors and remelting of the solidified material, so that the molten material can be circulated back to the vaporization zone. The condensate of the compressed vapor is the desired demineralized water or desalted liquid.

The molten material, given the abbreviation MM, is suitable if it is practically nonvolatile, immiscible with water and saline solution contacted, and of appropriate melting point under conditions desired in the system. For example, a material having a miscibility and volatility less than 0.5% that of water or the salt liquid being purified could be used. In any event, the system can be operated to recondense any MM vapor and separate the molten material; or additional means, e.g. adsorbents, can be used to treat the water or liquid solvent that is to be demineralized and freed of the MM.

A number of materials meet general requirements for functioning as the MM, but, of course, there are variations in their characteristics which are influential in their choice, depending also on the system used, the salt solution heated, and product purity desired. The MM can be organic or inorganic if it fulfills the criteria of having a freezing point in the right temperature region, generally in the range of 70 to 550° F., immiscibility with water or the saline solution, and a low vapor pressure. Examples of suitable organic materials are high melting point paraffin waxes. Other hydrocarbon or ester waxes of synthetic or biological origin may be used. Naphthalene (M.P. 176° F.) is an example of an aromatic compound which may be used. Metal alloys, e.g. lead-tin alloy (M.P. 356° F.), Wood's metal (M.P. 159° F.), Rose's metal (M.P. 201° F.) may be used. Sulfur (M.P. 233 to 246° F.), which is heavier than water, may be used.

While a particular MM may be preferred for one purpose or another, it is not intended that the invention be restricted to the use of any particular material nor to the use of the materials specifically described. Some of the molten materials have advantages of melting at higher temperatures and thus increase the vapor pressure of water in the vaporization zone, which in turn reduces the energy requirements in the operation of the vapor compressor. Some are better adapted for making potable demineralized water, e.g. the paraffin waxes. Others of higher melting points function well in obtaining demineralized water for boilers, industrial, or agricultural purposes. Some have a lower specific gravity and others a higher specific gravity than the salt solutions, but the process and apparatus of the invention are adapted to these differences.

Operations of the process will be described with reference to the drawing which shows schematically four types of apparatus. Still other modifications may be made, since the process is flexible. For the sake of simplicity, various accessories of well known functions which could be used, such as flow level, temperature, and pressure regulation, are not shown.

Figure 1:
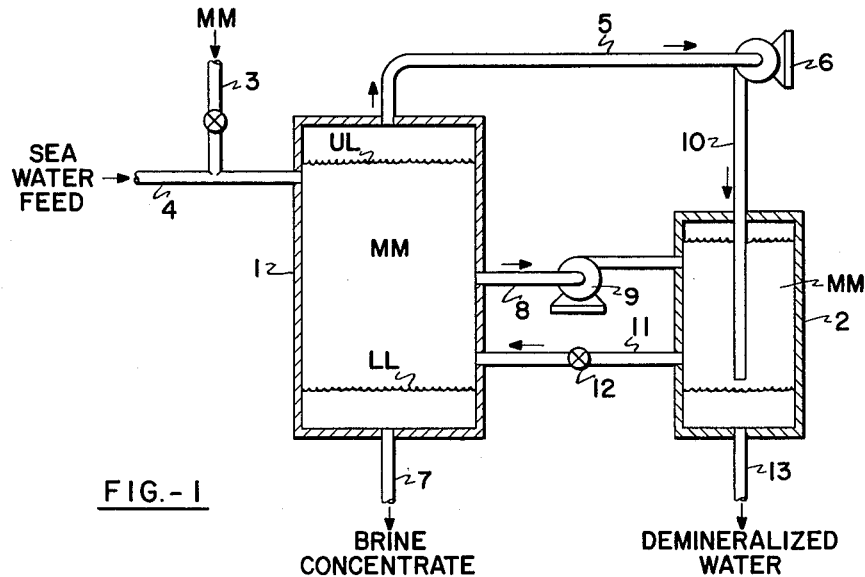
Fig. 1 illustrates in cross-section a two-vessel system adapted for use of MM having a lower specific gravity (sp. g.) than brine concentrate formed in a first vessel containing a vaporization zone. The second vessel receives compressed vapor brought into direct contact with partially solidified MM pumped from the first vessel.

A two-vessel system as shown in Fig. 1 contains a vaporization zone in vessel 1 and a vapor condensation zone in vessel 2. Liquid MM, e.g. molten naphthalene or wax, may be added as charge or to make up small losses near its melting point to vessel 1 from line 3. The salt contaminated liquid to be demineralized, e.g. sea water, is introduced into vessel 1 of line 4 to be contacted intimately with the MM liquid having an upper liquid level, UL, and a lower liquid level, LL. Pressure in vessel 1 is adjusted by evacuating vapor of the lower melting liquid (water) being freed of its salt through line 5 and vapor compressing pump 6. Vaporization of the water, or lower melting liquid, adsorbs heat which causes partial solidification of the liquid MM at its freezing point under the pressure in vessel 1. The lower melting liquid (water) vaporized in vessel 1 is only partly evaporated to leave a residual salt concentrate (brine)

solution which collects at the bottom of vessel 1 below lower liquid level, LL, and is discharged through line 7. The liquid MM suspension containing about 10 to 30 wt. percent of solidified MM particles is transferred through line 8 and pump 9 to vessel 2. Compressed vapors of the lower melting liquid (water) from pump 6 are passed by line 10 below the surface of MM liquid in vessel 2 so that heat from the condensation of the vapors remelts solid MM particles in vessel 2. The resulting liquid MM containing remelted MM particles formed in vessel 2 is circulated back to vessel 1 through line 11 and expansion valve 12 to vessel 1 where the pressure and temperature are lowered. Condensate of the lower melting liquid formed in vessel 2 is withdrawn as demineralized product through line 13.

The melting point of the MM is practically fixed so that the operating temperatures in vessels 1 and 2 are nearly the same. Actually in vessel 1 the prevailing temperature tends to be a few degrees lower than in vessel 2 since heat is removed from the MM in vessel 1 while heat is added to the MM in vessel 2. In any event, the equilibrium of the phases fixes the temperatures in each of the vessels.

Various accessory equipment not shown in the drawing may be used with the equipment, e.g. insulation around the vessels and conduits and heat exchange apparatus. Any desired proportion of heat contained in the discharged brine and discharged demineralized water can be transferred by heat exchange to the sea water feed to vessel 1 to bring its temperature up close to the temperature which is to prevail in vessel 1.

Using the kind of equipment illustrated in Fig. 1 and in the modifications thereof which will be further described, the principal energy input is in the vapor compressing pump yet this energy input is very low since there are only small temperature differences in all parts of the system as will be noted in the following specific example. A relatively small amount of energy input is required for circulating the MM liquid from the vaporization zone to the vapor condensation zone and recycling of the MM to the vaporization zone.

*Example I*

For the production of 100 gallons per hour of demineralized water from sea water having a 3 wt. percent salt content, the sea water feed is passed into the vaporization vessel at a rate of 200 gallons per hour. Using molten naphthalene as MM in the vaporization zone, the sea water feed is distributed into the MM having a temperature of 176° F. Water vapor is withdrawn from the upper part of the vaporization zone by operating the vapor compressing pump to maintain a pressure of 323 mm. Hg absolute.

The sea water feed is made to enter the MM at a rate to allow about half the water to vaporize and the residual concentrated brine gravitates downwardly through the MM to form a lower liquid phase, as below LL in Fig. 1. The residual concentrated brine containing 6 wt. percent salt is withdrawn at a rate of approximately 100 gallons per hour. At the upper level of the MM the temperature becomes lowered to 172° F. on account of the vaporization of water. By this removal of heat a portion of the MM is solidified. The extent of solidification of the MM is controlled by the rate of circulation of the MM to and from the vaporization zone so as to maintain suitable fluidity of the MM for pumping and recycling.

In this instance the partial solidification is controlled so that in the vaporization zone 20% of the MM is present as solids with 80% liquid. This mixture of liquid MM containing suspended solid form MM is pumped into a higher pressure condensation zone for contact with water vapor from the vaporization zone which has been compressed to a pressure of 385 mm. Hg absolute by the vapor compressing pump. Under these conditions the compressed water vapor is condensed and the water condensate settles down through the liquid MM to form a bottom liquid layer from which demineralized water is withdrawn at the rate of 100 gallons per hour and the solid particles of MM become remelted. The liquid MM formed by remelting of the slurried solid particles in the condensing zone retains a temperature of approximately 176° F. and is recycled to the vaporization zone for supplying heat therein by partial solidification for vaporizing more of the sea water feed. The circulation rate of the MM through the system for the condition set forth is 9000 gallons per hour.

It has been determined that with a compressor operating at 70% efficiency, the heat energy input for producing the 100 gallons of demineralized water per hour is only 4.3 kilowatt hours per hour. This means that approximately 150 B.t.u. of work are put into the system by the compressing pump for vaporizing a gallon of the water, which is a very low amount compared to the amount of heat required for other types of water vaporizing systems. The amount of power needed for the circulation of the MM liquid is relatively small, amounting to less than 5% of the power input for operating the vapor compressing pump.

*Example II*

A high melting point wax with a melting range of 300 to 310° F. is used as the molten material supplied to the vaporization zone. Saline water to be demineralized is contacted with the molten wax at a temperature close to 302° F., the saline water having been preheated to a temperature in the range of 290 to 300° F. In the vaporization zone a pressure of 63.1 pounds per square inch absolute is established by removing water vapor from the vaporization zone by a vapor compressor. The vapors are compressed to a pressure of 73 pounds per square inch absolute. The compressed vapors are brought into heat exchange with a slurry of the molten wax containing 10 to 20% solidified wax. Under the increased pressure the water vapor is condensed and the heat of condensation melts the solidified wax. The molten wax is recycled to the vaporization vessel. A major amount of the molten wax, of the order of 30 to 50 gallons, is circulated per gallon of saline water fed into the vaporization zone. In this kind of operation 4 to 6 kilowatt hours per 100 gallons of purified water is supplied the compressing pump to maintain the desired operation.

It is to be noted that the differences in temperature between the phases in the vaporization and the condensing zones are only a few degrees since there are similar equilibrium changes occurring in both zones. In general, the difference in temperatures in the two zones amounts to 2 to 10 Fahrenheit degrees. The lower the difference in temperature, the more efficient the operation becomes. The required compression becomes undesirably high when the differences in temperature are substantially above 10 Fahrenheit degrees, such as occurs in systems that depend solely on indirect heat exchange of compressed vapors with the material which is to be supplied with heat.

Figure 2:
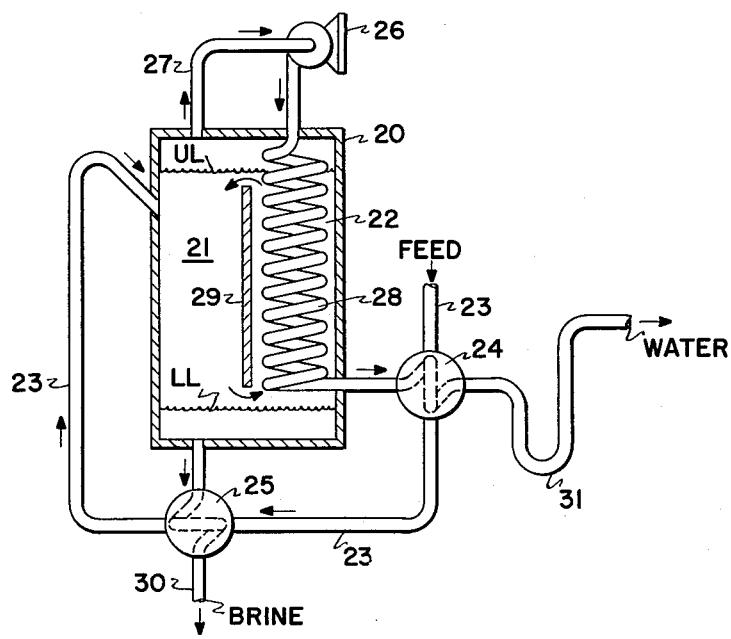
Fig. 2 illustrates in cross-section a single vessel having a vaporization zone partitioned from a zone in which partially solidified MM is remelted by indirect heat exchange with compressed vapor from the vaporization zone. The pressure in the vaporization zone is the same as in the remelting zone for this system which is adapted for MM of lower sp. g. than water.

In the single vessel system, shown in Fig. 2, a modification is made to permit the water vapor to be condensed out of contact with the MM. In this operation heat is transferred from the compressed vapors through a conduit to the MM slurry with some loss of efficiency thereby but with the advantage that the condensed water vapor, or volatilized low melting liquid, is kept separated from the MM and is thereby kept free of the contamination from the MM. However, in the system of Fig. 2 there are some compensating advantages in the way of a simplified apparatus, lower power requirements for circulating liquid MM, and heat transfer between the vaporization and condensing zones.

In the apparatus of Fig. 2, the vessel 20 contains a vaporization compartment 21 and the MM remelting compartment 22. The sea water, or salt contaminated volatile liquid from which demineralized liquid is to be separated is passed into the vaporization compartment from line 23, which may have the form of a jet inlet. The sea water feed is preheated by heat exchange with effluent products and heat exchangers 24 and 25. The preheated sea water introduced from line 23 aids in a downward circulatory motion of the MM flowing downward in compartment 21. On contact of the sea water with the MM partial solidification of the MM is effected, e.g. in the range of 5 to 30% at a temperature a few degrees lower than the temperature at which the MM enters the upper compartment of 21. The vapors are formed from the sea water under the pressure established by the vapor compressing pump 26 in the vapor withdrawal line 27. The temperature and pressure desired in the vessel 20 depend on the melting point of the MM selected, the same as in the operation of the apparatus shown in Fig. 1.

The vapors of the volatile liquid, e.g. water from sea water, are compressed by the vapor compressing pump 26 into the condensing coil 28 which is positioned in one portion of the vessel 20 where the MM slurry of partially solidified MM is to be remelted. A partition, such as a vertical baffle 29, may be placed in vessel 20 to separate the compartment 21 from compartment 22, particularly for controlling the flow of materials in vessel 20.

The slurry of molten material with partially solidified MM flows downwardly in compartment 21 between the walls of the vessel 20 and the baffle 29 toward the bottom of vessel 20 where the liquid residual salt solution accumulates as a lower layer below the liquid phase boundary LL. This residual salt solution or concentrated brine is withdrawn from vessel 20 through line 30 and can be used for supplying heat into the heat exchanger 24 to the incoming salt solution feed.

The slurry of MM partially solidified passes below the baffle 29 and up through the compartment 22 for reheating by indirect heat exchange with the vapors compressed in the condensing coil 28. By this indirect heat exchange the partially solidified MM is remelted. The MM containing remelted MM flows upwardly through compartment 22, then flows over the baffle 29 to be returned into contact with the incoming salt solution on which liquid is to be vaporized. A trap 31 on the outlet of the condensing tube 28 is used to maintain a desired pressure in the condensing tube. The condensate flowing out from the condensing tube 28 is passed in heat exchange with the salt solution feed being supplied under pressure to the system through line 23.

It is to be understood that auxiliary equipment not shown in Fig. 2 may include insulation around the outside of the vessel 20 and on the conduits and heat exchange apparatus. Other heat exchange means may be used provided heat is not supplied through fixed surfaces to the salt solution as it is undergoing concentration by vaporization of volatile liquid therefrom insofar as such heat exchange can be avoided to prevent fouling. In the operation of the apparatus illustrated by Fig. 2, the MM in molten state is a material having a lower specific gravity than the salt solution being treated to remove volatile solvent. Again, as in Fig. 1 the MM employed in Fig. 2 may be a relatively nonvolatile organic material, such as naphthalene or a wax, a halogenated aromatic hydrocarbon, or highly alkylated aromatic hydrocarbon having a melting point in the range of 120 to 480° F.

The difference of temperatures for the phases in the vaporization zone is of a low order, generally less than 10 Fahrenheit degrees. The difference between the temperatures of the vapors compressed in the condensing coil 28 and the temperature of the MM slurry in compartment 22 of Fig. 2 may be of the order of 10 to 20° F. depending on the construction of the condensing coil for allowing heat conduction. Nevertheless, there is a considerable saving in heat energy with the operation of Fig. 2 and in the avoidance of fouling by deposits on fixed heat transfer surfaces from salt solutions. If an internal baffle 29 is employed as a partition between vaporized zone and remelting zone in vessel 20 there is a small amount of heat transfer through such a baffle, but the main heating is accomplished through the direct heat transfer from the MM undergoing partial solidification in the liquid MM flowing into contact with the salt solution which is being treated for vaporization of the liquid therefrom.

Figure 3:
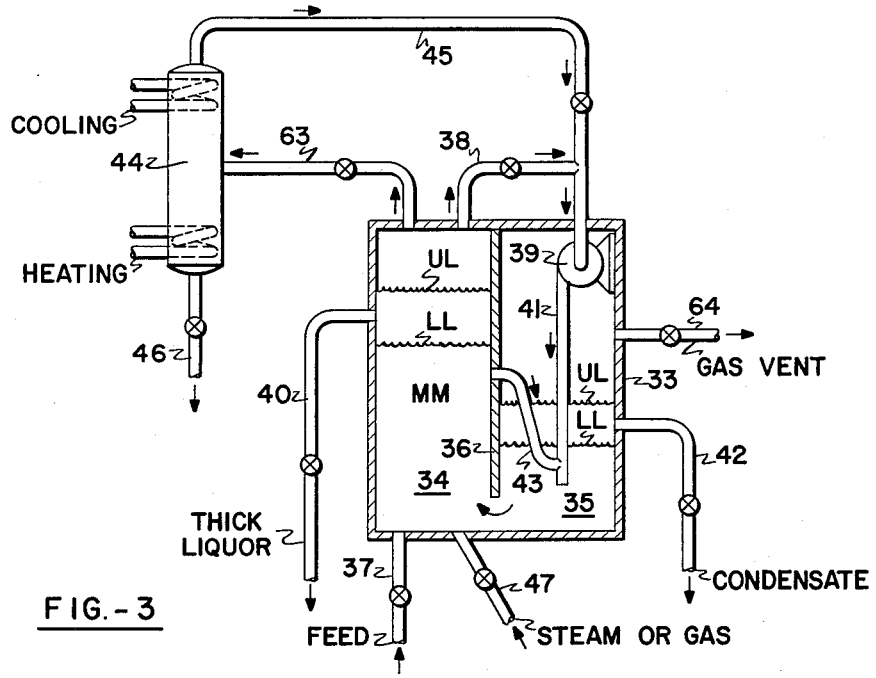
Fig. 3 illustrates in cross-section a single vessel containing a vaporization zone and a higher pressure compartment in which circulated partially solidified MM contacts compressed vapors from the vaporization zone for condensation of the vapors in remelting of solidified MM of higher sp. g. than the salt solution.

The apparatus shown in Fig. 3 is adapted for use with MM of higher specific gravity than the salt solution or the volatile liquid vaporized therefrom. The apparatus comprises a vessel 33 containing a vaporization zone compartment 34 and a condensation zone compartment 35. These compartments are separated by a partitioning baffle 36. The vessel 33 is made to contain the MM with a higher level LL on the vaporization side than the level LL on the condensation side due to the higher pressure in the vaporization zone compartment. The salt solution or sea water feed is passed into the molten MM from line 37 in the vaporization zone. The vapors and concentrated brine, or thick liquor, rise to the upper part of the vaporization zone 34 so that vapors can be withdrawn through line 38 by the compressing pump 39. The concentrated brine stratifies above the MM level LL and has an upper level UL. The concentrated brine is withdrawn through line 40. The vapors of the volatile solvent, e.g. water vapor, are compressed and heated by the pump 39 and passed therefrom through line 41 into contact with the MM slurry of partially solidified molten material below its boundary level LL in the compartments 35. The compressed and heated vapors from line 41 cause melting of the solidified MM and undergo condensation to form a layer of demineralized water having an upper level UL in compartment 35. This demineralized water is withdrawn through line 42. Circulation of MM slurry containing MM solid from zone 34 to zone 35 through line 43 may be obtained by the velocity effect of the compressed vapors in line 41 in drawing the slurry from line 43.

In addition to the circulating effects of the incoming feed and of the compressed vapors in each of the zones auxiliary agitating or circulating means may be employed for circulating the MM slurry from the vaporization zone to the condensation zone and for recycling the MM to the vaporization zone. Other accessory equipment such as described with reference to Fig. 1 and Fig. 2 may be employed.

As an alternative in Fig. 3, vapors of the volatilized liquid and any gases may be withdrawn from the upper part of the vaporization compartment 34 through line 63 to a gas separator or fractionator 44, whence overhead gas or uncondensed vapor, e.g. steam or stripping gas, is passed by line 45 to the vacuum and compressing pump 39. By use of this alternative, condensate product may be separated and withdrawn through line 46 from the fractionator 44. Steam or stripping gas to aid vaporization may be introduced through line 47 into the MM flowed into the vaporization compartment. Line 64 is gas vent to a condenser.

An auxiliary heating means, e.g. a heat exchanger (not shown), may be used in the remelting of the solid MM flowing through the zone 35, if desired.

Figure 4:
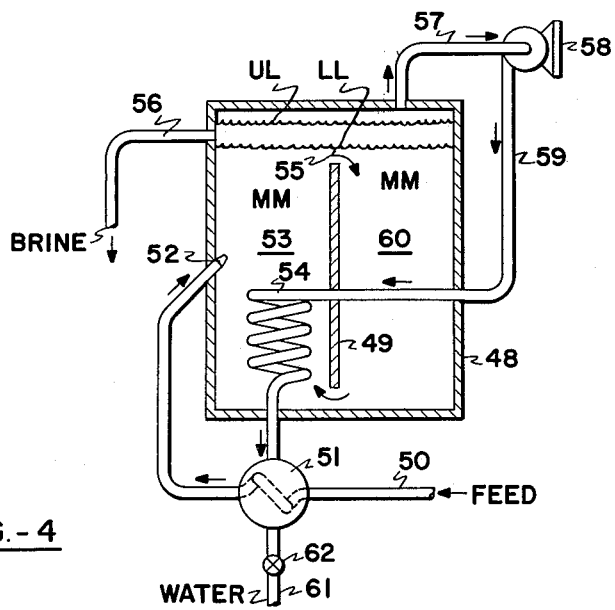
Fig. 4 illustrates in cross-section a single vessel adapted for use of MM of higher sp. g. than salt solution from which liquid is vaporized by contact in a zone located above a zone where indirect heat exchange is carried out between compressed vapors and circulated MM; circulation being aided by jet action of entering salt solution and convention circulating effects.

The apparatus shown in Fig. 4 is a modification for condensing the vapors of the volatile liquid, such as water, by indirect heat exchange with the slurry of MM containing partially solidified MM so as to minimize contamination of the demineralized condensate. In this type of apparatus an arrangement of the feed inlet and of the condensation heat exchange coil is such as to aid circulation of the MM slurry. The apparatus shown in Fig.

4 comprises a vessel 48 which is partitioned by the baffle 49. The salt solution or sea water feed is passed through line 50 through a heat exchanger 51, then is introduced through a jet inlet 52 into a vaporization zone 53 where the salt solution from which volatile liquid is to be vaporized intimately contacts a stream of MM rising from a lower part of the vessel 48 where it flows past a heat exchanger 54. The unvaporized concentrated salt solution forms an upper layer above the boundary level LL of the molten MM slurry and as an upper level UL in a stratification zone 55. This concentrated salt solution or brine is withdrawn through line 56. The volatilized solvent of the salt solution or water vapor from the sea water is withdrawn from the upper part of vessel 48 through line 57 through vapor compressing pump 58 and is forced down through line 59 into the heat exchanger 54. In the operation of this kind of apparatus the slurry of partially solidified MM formed in the vaporization zone 53 is made to flow over the baffle 49, then is circulated down through the passageway 60 bounded by walls of the vessel 48 and baffle 49 to be returned upwardly past the condensing conduit or heat exchanger 54 into the vaporization zone 53. While the slurry passes the vapor condensing conduit 54 the solid particles of MM are remelted by indirect heat exchange with the hot compressed vapor or gaseous fluid which is inside the conduit 54. The condensate of demineralized liquid flows down through the interior of the conduit 54 through the heat exchanger 51 and is removed through the line 61 through a pressure control valve 62 or a suitable trap.

*Example III*

Using a lead-tin alloy eutectic at its melting point of 356° F., 124 pounds per square inch is maintained in the vaporization zone in vaporizing water from a mineral water or saline solution. The vapors are withdrawn from the vaporization zone and compressed to a pressure that would make their equilibrium condensation temperature fall in the range of 365 to 375° F. and under these conditions are passed into a vaporization coil or compartment for heat exchange with a slurry of the molten lead-tin alloy containing 15% solidified eutectic.

*Example IV*

Using molten sulfur as MM in the vaporization zone, the temperature of the sulfur is maintained at 235° F. in contact with sea water from which water is to be evaporated. The vaporized water is compressed and condensed at a temperature of 237 to 245° F.

*Example V*

In the system illustrated by Fig. 3, a lead-bismuth alloy is used as the MM. An alloy containing 58 wt. percent bismuth has a melting point of 257° F. The saline water is introduced into vessel 34 where it bubbles up through the hot molten alloy. A pressure of 31.0 pounds absolute is maintained at the inlet to pipe 38 which causes the water to boil at about 253° F. The concentrated brine from which a portion of the water has been removed by vaporization is discharged through pipe 40. The vaporization of the water removes heat from the alloy and causes a portion of it to freeze. The alloy in vessel 34 is a slurry of about 20 wt. percent solid. This slurry is circulated to vessel 35 where it is contacted with the water vapor which has been compressed to 36.0 pounds absolute. The water vapor is condensed and the solid alloy is melted. The condensate is withdrawn through pipe 42 as the demineralized water and the molten alloy containing about 5 wt. percent solid is recycled back to vessel 34. Due to the difference in pressure in vessels 34 and 35, there is a difference in level of the alloy of about one foot. For each 100 gallons of demineralized water that is withdrawn through pipe 46, about 3500 gallons of the slurry are circulated between the two vessels. The power required by the compressor is 4 kilowatts per 100 gallons of demineralized water.

The present method of operation using a molten material near its transition point for heat transfer lends itself to a variety of uses and variations in mechanical construction of apparatus suited for evaporating or distilling various volatile liquids from many kinds of mixtures. The liquid to be evaporated may be less or more viscous than water. For example, the operation may be used in what is termed glycerine evaporation in which water and glycerine are separated from spent soap lyes. Steam or gas may be used to aid the vaporization of the liquid being volatilized, e.g. glycerine or liquid higher boiling than water, and the thus used gaseous stripping agent may be compressed to be returned to the condensing zone for heat exchange with the molten material together with the volatilized liquid or separated therefrom through an intermediate condensation step. The process applies similarly to the separation of volatile organic solvents or components of organic mixtures. The apparatus may be designed to suit the needs of various feeds, e.g. foamy liquid mixtures, viscous liquid mixtures, and mixtures for which excessive heating or long contact with a heating surface is undesirable. The construction and operation can be such as to distribute the feed through the molten material, to impart high velocity to the material from which volatile material is to be vaporized and also to give a forced circulation if so desired to the molten material either by circulating means or natural effects.

For the sake of simplicity, various controls and instruments known in the art for checking the operations of evaporators and stills have not been shown. Other common evaporator accessories have not been shown, for example, condensers for separating condensate product for noncondensed gases, various entrained-liquid deflecting devices, various vacuum pumps including the jet ejector type, various condensate removal traps and pumps for removal of liquids, devices for receiving and separating salts from a thick liquor where the salt product is to be recovered. Other devices may also be used for withdrawing the molten material which for the most part is circulated in the condenser and vaporizer in order to remove impurities from the molten material.

The invention described is claimed as follows:

1. A process for vaporizing a liquid from a less volatile component of a feed mixture which comprises contacting said feed mixture in a vaporization zone with a molten material heated to a temperature near and above its solidification temperature and higher than the temperature of said feed mixture, said molten material being less volatile than said liquid, in proportions such as to effect a partial solidification of said molten material and to effect vaporization of a substantial portion of said liquid by means of the heat evolved from said solidification, stratifying the unvaporized portion of said feed mixture as a phase separate from said molten material in a stratification zone, withdrawing vapors from said vaporization zone, withdrawing said unvaporized portion of said feed from said stratification zone, circulating said molten material and solidified particles thereof through a heating zone wherein said solidified particles are remelted, and recycling molten material from said heating zone to said vaporization zone.

2. A process in accordance with claim 1 wherein said molten material containing solidified particles thereof is brought into heat exchange in said heating zone with vapors withdrawn from said vaporization zone and compressed to higher pressure than prevails in said vaporization zone, thereby heating said molten material and remelting the solidified particles contained therein.

3. A process in accordance with claim 2 wherein said heat exchange is indirect heat exchange.

4. A process for separating water from an aqueous salt solution, which comprises intimately contacting said salt solution in a vaporization zone with a less volatile, water imiscible, molten material having a melting point in the range of 70° to 550° F. under conditions of temperature and pressure and in proportions such as to effect a partial solidification of said molten material and to effect vaporization of a substantial portion of said water from said salt solution with heat liberated in said solidification, withdrawing water vapors from said vaporization zone, compressing thus withdrawn water vapors, passing the resulting compressed vapors into a vapor condensation zone, circulating a slurry of said molten material containing solidified particles thereof formed in said vaporization zone into heat exchange with said compressed vapors in said condensation zone and remelting said solidified particles with heat evolved from said compressed vapors undergoing condensation in said condensation zone, removing from said vaporization zone unvaporized salt solution of higher salt content than the first said aqueous salt solution, recirculating molten material from said condensation zone to said vaporization zone, and withdrawing condensed water of low salt content from said condensation zone.

5. A process in accordance with claim 4 wherein said aqueous salt solution is sea water and the condensed water withdrawn from said condensation zone is demineralized water.

6. A process in accordance with claim 4 wherein said molten material which undergoes partial solidification in said vaporization zone is an organic material of lower specific gravity than water and wherein said unvaporized salt solution is withdrawn from said vaporization zone from below said molten material.

7. A process in accordance with claim 4 wherein said molten material which undergoes partial solidification in said vaporization zone is a material of higher specific gravity than said unvaporized salt solution which therefore forms a layer above the molten material and is withdrawn from said vaporization zone from said layer.

8. A process in accordance with claim 4 wherein said heat exchange is direct heat exchange.

9. A process in accordance with claim 4 wherein said heat exchange is indirect heat exchange.

10. A process in accordance with claim 4, wherein vapors from said vaporization zone are compressed and condensed in said condensation zone under a pressure higher than that maintained in said vaporization zone, and said molten material is heated to a temperature of about 2° to 10° F. higher than the temperature at which said aqueous salt solution is introduced into said vaporization zone.

11. A process in accordance with claim 4 wherein said aqueous salt solution is preheated by heat exchange with unvaporized salt solution concentrated in said vaporization zone and separated from said molten material therein, and wherein said molten material is circulated in a quantity substantially higher than the quantity of salt solution fed into said vaporization zone per unit of time.

12. An apparatus for vaporizing a liquid from a relatively less volatile component of a liquid mixture, which comprises a vaporization compartment, inlet means for introducing the liquid mixture into the vaporization compartment for intimate contact therein with a circulated molten material which remains nonvolatile, a conduit and compression means communicating with said vaporization compartment for removing gas and vapor from said vaporization compartment and compressing same, a conduit for removing residual concentrated liquid mixture from said vaporization compartment, internal walls forming a passageway for molten material to circulate out of contact from said liquid mixture and then return into contact with said liquid mixture, and a heat exchange means in said passageway in communication with said compressing means for passage of compressed gaseous fluid from said compressing means in indirect heat exchange with said molten mixture while out of contact with said liquid mixture.

References Cited in the file of this patent
UNITED STATES PATENTS

| | | |
|---|---|---|
| 2,081,988 | Dreyfus | June 1, 1937 |
| 2,127,004 | Nelson | Aug. 16, 1938 |
| 2,151,990 | Ruys | Mar. 28, 1939 |
| 2,315,422 | Hilderbrandt | Mar. 30, 1943 |
| 2,445,327 | Keith | July 20, 1948 |
| 2,474,735 | Harmon | June 28, 1949 |
| 2,619,453 | Andersen | Nov. 25, 1952 |
| 2,619,814 | Kniel | Dec. 2, 1952 |